United States Patent
Mukai

(10) Patent No.: US 7,830,765 B2
(45) Date of Patent: Nov. 9, 2010

(54) METHODS AND APPARATUS TO MONITOR AND CONTROL HARD-DISK HEAD POSITION

(75) Inventor: Hiroyuki Mukai, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 681 days.

(21) Appl. No.: 11/726,532

(22) Filed: Mar. 22, 2007

(65) Prior Publication Data

US 2008/0232218 A1    Sep. 25, 2008

(51) Int. Cl.
*G11B 20/00* (2006.01)
(52) U.S. Cl. .................. 369/53.38; 360/75
(58) Field of Classification Search .......... None
See application file for complete search history.

(56) References Cited

U.S. PATENT DOCUMENTS

| 6,411,458 B1 | 6/2002 | Billings et al. |
| 2005/0105204 A1 | 5/2005 | Bloodworth et al. |
| 2007/0058280 A1 | 3/2007 | Wada et al. |

OTHER PUBLICATIONS

Brian E. Schultz, "Thermal Fly-height Control (TFC) Technology in Hitachi Hard Disk Drives", Hitachi Inspire the Next, www.hitachigst.com, 2006 Hitachi Global Storage Technologies, pp. 1-4.

*Primary Examiner*—Paul Huber
(74) *Attorney, Agent, or Firm*—Dawn V. Stephens; Wade James Brady, III; Frederick J. Telecky, Jr.

(57) ABSTRACT

Methods and apparatus to monitor and control hard-disk drive head position are described. In one example, a hard-disk drive system includes a hard-disk drive platter, a hard-disk drive read head configured to read information from the hard-disk drive platter, and a hard-disk drive head position controller configured to a receive a signal via the hard-disk drive read head and to determine if the received signal indicates that a distance between the hard-disk drive platter and the hard-disk drive is less than a predetermined distance and to vary a temperature of the read head based on the determination.

12 Claims, 3 Drawing Sheets

METHODS AND APPARATUS TO MONITOR AND CONTROL HARD-DISK HEAD POSITION

TECHNICAL FIELD

The present disclosure pertains to computer systems and, more particularly, to methods and apparatus to monitor and control hard-disk drive (HDD) head position.

BACKGROUND

Hard-disk drives use one or more disks or platters that rotate about a spindle with respect to one or more heads, such as read and/or write heads. The read or write heads read information from or impart information to the disk platters, but do not, in desired operation, physically contact the platters. To the contrary, HDD heads are suspended above the spinning platters.

To adjust head position (e.g., height) relative to the disk surface, thermally sensitive material is used in the head. The thermally sensitive material expands and contracts based on head temperature and, therefore, changes the position of the head relative to the disk. Known systems monitor and control head temperature and make assumptions regarding head position based on head temperature.

DETAILED DESCRIPTION

Figure 1:
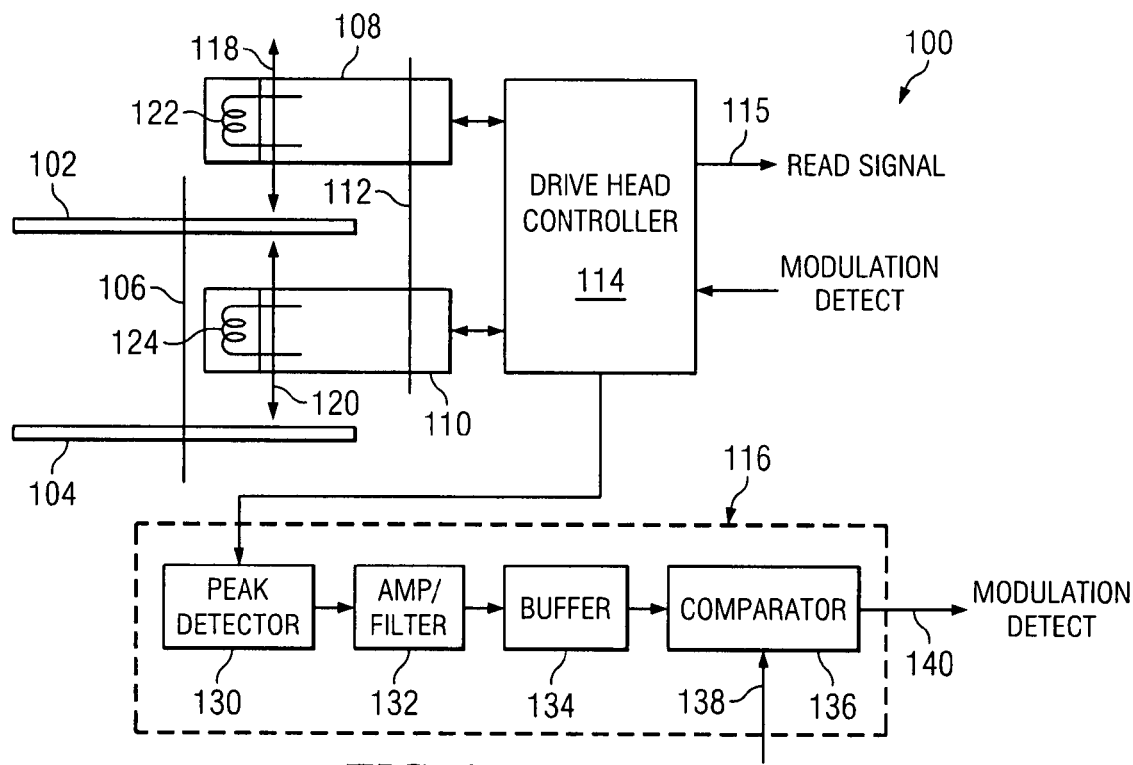
FIG. 1 is a diagram of a system including a HDD and a circuit to detect and control HDD head position.

As shown in FIG. 1, a HDD system 100 of a computer may include one or more platters 102, 104 that spin about a spindle 106. One or more read or write heads 108, 110, which pivot about an axis 112, are provided above the platters 102, 104 for reading information from or writing information to the platters 102, 104.

In the read context, the heads 108, 110 are coupled to a drive head controller 114, which, as described below in detail, processes signals from the heads 108, 110 to produce a read signal 115. The read signal 115 may be passed to any number of different circuits that are provided in conjunction with processing signals from a HDD. Signals from the drive head controller 114 are also coupled to a HDD head position detector 116. The drive head controller 114 may form a portion of a preamplifier, also referred to as a preamp.

As described below in detail, the HDD head position detector 116 monitors the positions (or heights) of heads (e.g., the heads 108 and/or 110) with respect to the platters (e.g., the platters 102 and/or 104) and provides feedback regarding the same. As will be readily appreciated by those having ordinary skill in the art, the positions of the heads with respect to the platters oscillates. This head oscillation is represented in FIG. 1 by the arrows 118 and 120. When heads (e.g., heads 108, 110) are close to the platters, a modulation in a read signal results due to a resonance effect between the heads and the platters. The HDD head position detector 116 processes signals from the drive head controller 114 to determine when the heads are close to, or far from the platters (i.e., when the distance between the platters and the heads is small and large) based on modulation in the read signals. Based on this position information provided by the HDD head position detector 116, the drive head controller 114 controls one or more heating elements 122, 124 disposed on or near the heads. The control of the heating elements 122, 124 causes the temperature of the heads to be increased or decreased, thereby changing the spacing between the heads and the platter due to thermally sensitive material (not shown) in the heads 108, 110.

As shown in FIG. 1, in one example implementation the HDD head position detector 116 includes a peak detector 130, an amplifier/filter 132, a buffer 134, and a comparator 136. In operation of the HDD head position detector 116, the peak detector 130 receives signals from the drive reader and controller 114, the details of which are described below, and produces an output signal representative of the peaks in the received signal (e.g., the peak detector 130 forms an envelope of the signal from the drive head controller 114). The signal representative of the peaks is amplified and filtered by the amplifier/filter 132 and buffered by the buffer 134. The output of the buffer 134 is coupled to the comparator 136, which also receives a reference 138, such as a reference voltage. The reference 138 is a signal representative of the levels at which the signal provided by the buffer 134 indicates that the head is physically close to the platter. In one example, the threshold or reference 138 may include one or more of high and low reference signals or thresholds. The comparator 136 provides, for example, an output signal 140 indicative of when the signal from the buffer 134 exceeds the reference 138, thereby indicating that the head is a predetermined distance from the platter or disk, which results in modulation of the read signal.

As described below, the output 140 of the comparator 136 is, for example, a square wave signal having a varying duty cycle, wherein non-zero portions of the square wave indicate that the signal from the buffer 134 exceeds the reference 138. Thus, the output 140, when it transitions between high and low states, indicates modulation in the signal from the buffer 134, which indicates that the head is close to the disk. The duty cycle of the square wave signal is indicative of height of the head with respect to the disk and, therefore, indicative of the heating element power required to maintain head position relative to the disk. That is, due to the oscillating nature of the head position with respect to the disk, the longer a particular pulse from the comparator is high, the greater the peak of the envelope of the read signals. This peak indicates that the distance between the head and the disk is relatively small at the peak. The output 140 is a modulation detect signal that is coupled to the drive head controller 114, which, as described below, includes a heater controller.

Figure 2:
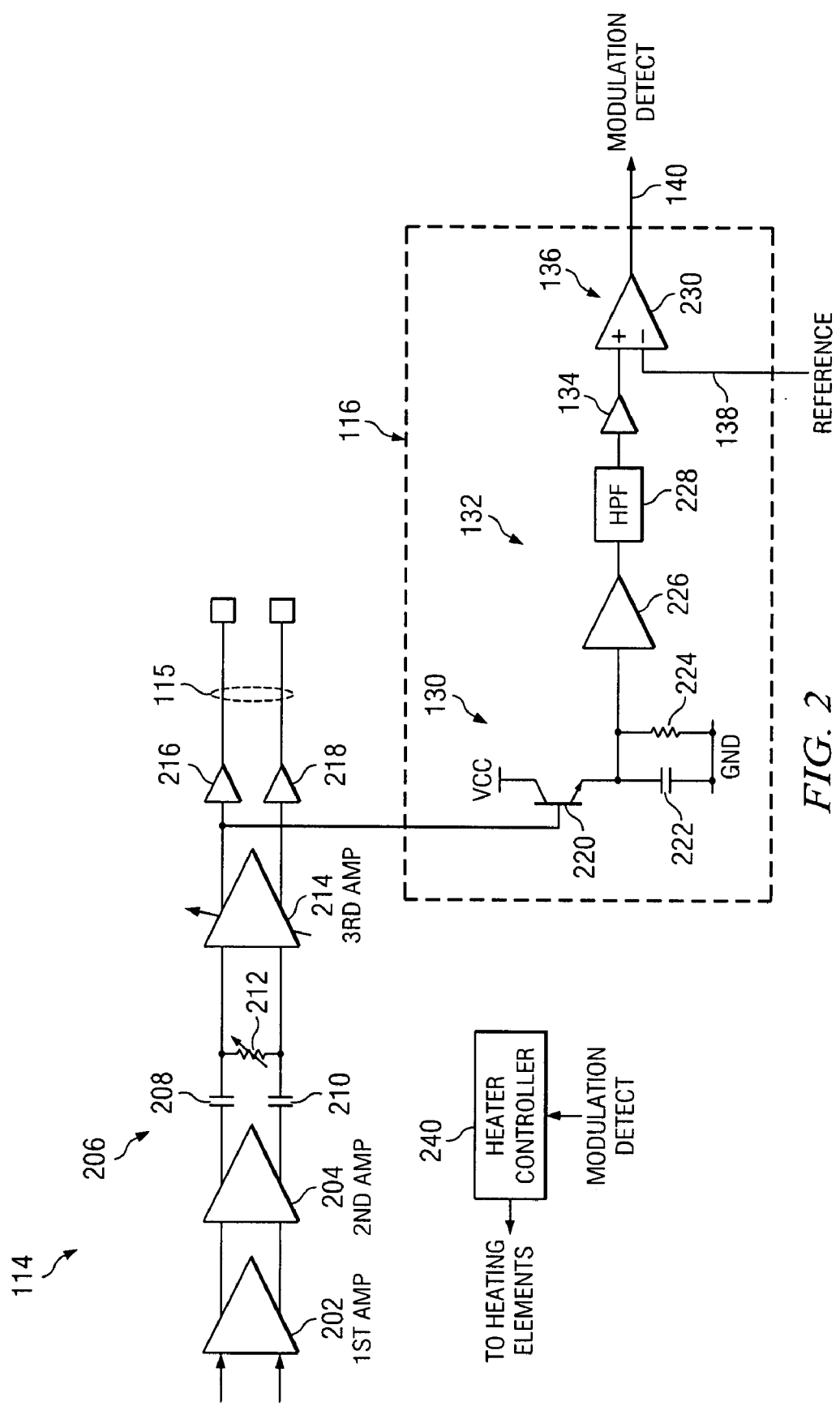
FIG. 2 is schematic diagram showing additional detail of the drive head controller and the HDD head position detector of FIG. 1.

The drive head controller 114 may include a number of discrete components, examples of which are shown in FIG. 2. In one example, the drive head controller 114 may include a first differential amplifier 202 that receives differential signals from a read head (e.g., one of the heads 108 and 110). The output from the first differential amplifier 202 is provided to a second differential amplifier 204, the output of which is coupled to a high-pass filter 206, which may be constructed from series capacitors 208, 210 on the differential lines from the second amplifier 204 and a resistor 212, variable or fixed, coupled across the differential lines. The output of the high pass filter 206 is coupled to a variable gain amplifier 214, each differential output line of which is buffered by a buffer 216, 218. The read signal 115 is taken from the outputs of the buffers 216, 218.

As shown in FIG. 2, according to one example, an input signal for the HDD head position detector 116 is taken from the input to the buffer 216. Of course, the input signal could be taken from the input to the buffer 218 of from any other suitable place within the drive head controller 114. Additionally, in other implementations, differential signals may be used as an alternative to or in addition with single ended signals.

The input signal provided by the drive head controller 114 is coupled to the peak detector 130 and drives the base of a transistor 220 thereof. The transistor 220 has an emitter coupled to ground via a parallel combination of a capacitor 222 and a resistor 224. In one example implementation, the capacitor 222 may be 10 picofarads (pF), and the resistor 224 may be 50,000 Ohms (50 Kohms). The values of the capacitor 222 and the resistor 224 are selected to extract the envelope of the signal provided to the HDD head position detector 116. Of course, other circuit values and/or components could be used.

The emitter of the transistor 220 provides the input to the amplifier/filter 132, which, in one example, includes an amplifier 226 having a gain of two and a high pass filter 228 having a −3 dB point of, for example, 16 kilohertz (KHz). The frequency of the high pass filter 228 is chosen to extract the envelope from the input signal.

The output signal from the high pass filter 228 is coupled to the buffer 134, the output of which provides an input to the comparator 136. In one example, the comparator 136 may be implemented using an operational amplifier 230 that also receives the reference 138. For example, the operational amplifier 230 may receive a reference or threshold at its inverting input and may receive the buffer 134 output at its non-inverting input. When configured as such, the operational amplifier 230 will output a logical one (e.g., a high signal) when the signal from the buffer 134 exceeds the threshold and will be a logical zero (e.g., a low signal) otherwise. Of course, the input signals to the operational amplifier 230 may be changed, which would result in a change in the sense of the output signal for given magnitudes of the input signals provided by the reference 138 and the buffer 134.

The signal from the operational amplifier 230 is a modulation detection signal that, as described below, is indicative of head position and attendant head heating or lack of heating that should be carried out to maintain the head at a desirable height over the disk. When pulses are present on the modulation detection signal, the head is resonating with a disk, which indicates that the head is too physically close to the disk. For example, in a situation in which head position is close to the platter surface, the modulation detect signal may be a square wave signal having numerous pulses that is coupled to a heater controller 240 of the drive head controller 114. The heater controller 240 may, in response to a pulse in the modulation detect signal, disable heating of the heating elements (e.g., one or more of the heating elements 122, 124) or decrease the heating power of the heating elements (e.g., one or more of the heating elements 122, 124) or may change (e.g., decrease) the duty cycle of the energy applied to the heating elements. The HDD head position detector 116 and the drive head controller 114 cooperate to form a head position controller.

Figure 3:
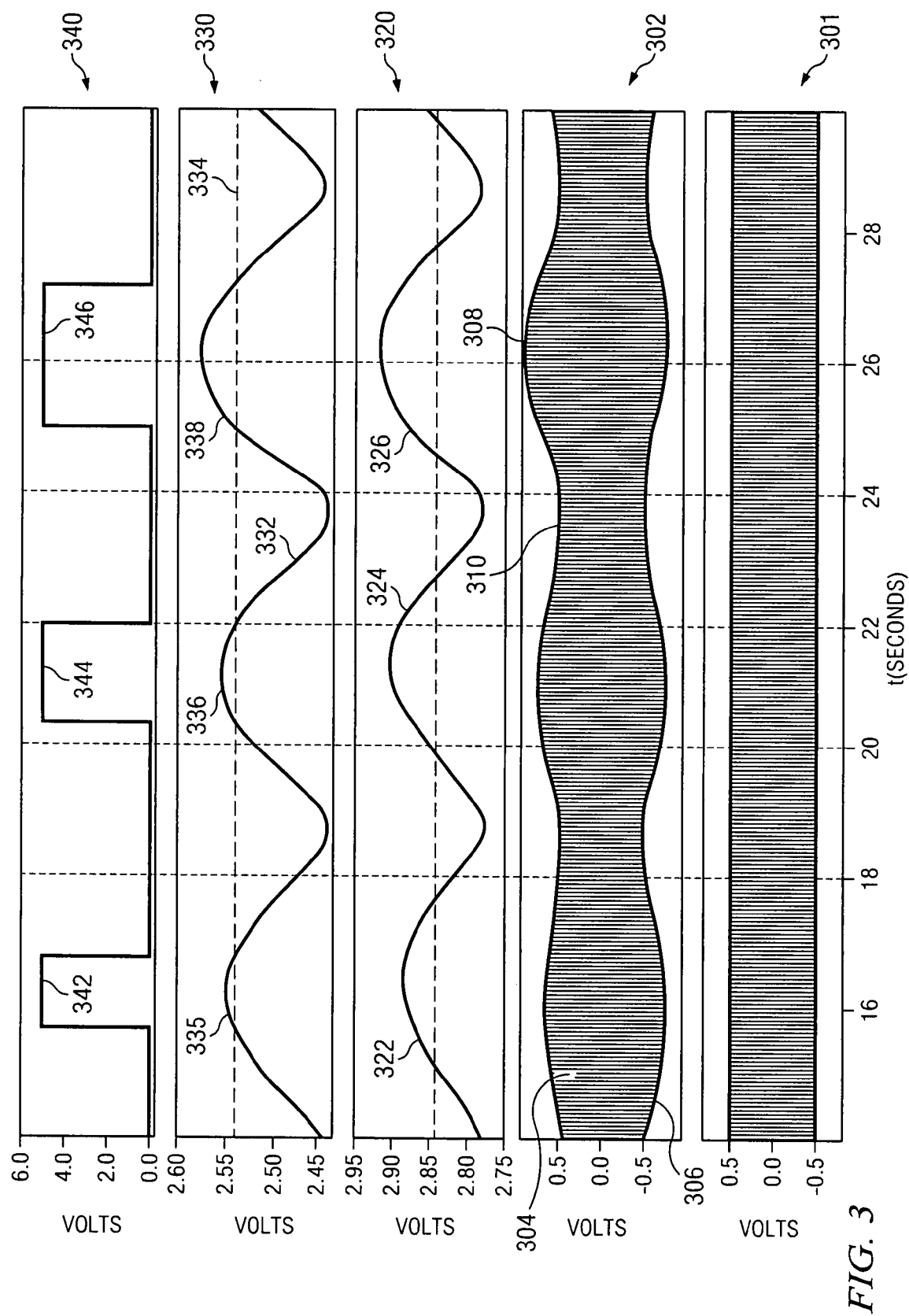
FIG. 3 is plot of various electrical signals against time in a functioning circuit constructed in accordance with the schematic of FIG. 2.

The operation of the HDD head position detector 116 shown in FIG. 2 will now be described in conjunction with the signal plots shown in FIG. 3.

The signal at the buffer 216 may have no oscillations because the heads are not close enough to the platters to create the resonant effect. Thus, as shown in FIG. 3 at the plot 301, the signal at the buffer 216 may have a constant envelope. That is, the resonant effect is not noticed in the signals in the plot 301.

However, in the case of oscillations caused by head movement and/or the resonant effect, resulting signals are shown at the plot 302, in which 304 refers to the read signals and 306 refers to the envelope of the signals 304. As will be readily appreciated, the read signals 304 are extremely high in frequency and include servo control signals and modulated signals representing data read by the head from the platter. However, the magnitude of the envelope 306 varies when the head is close to the platters due to the resonant effect between the head and the platter. For example, the peak in the envelope amplitude shown at reference numeral 308 and the trough envelope amplitude shown at reference numeral 310 indicate that the head is close enough to the platter to cause modulations and, therefore, heating should be changed (e.g., reduced).

As described above, the envelope of the signals indicates how much head heating is required or not required. As shown in the plot 320, the signal 304 containing the high frequency components has been removed and only the envelope remains. During oscillations caused by close head proximity to the platter, the typical envelope amplitude 306 varies between 1-10%, as reflected in the difference between 308 and 310 is 1-10% of amplitude of the signal 304. The amplitude of signal 304 is predictable from head sensitivity and system gain of 114 and 132/134.

Plot 320 shows an output of the amplifier 226. Reference numerals 322, 324, and 326 refer to peaks in an amplified version of envelope 306 of the read signals 304.

Plot 330 shows the output from the buffer 134 at reference numeral 332. The threshold to which the signal at reference numeral 332 is compared is shown at reference numeral 334 in FIG. 3. The signal 332 includes three peaks 335, 336, and 338, all of which exceed the threshold 334 to some degree and for some period of time. As explained above, changes in the envelope (such as exceeding the threshold 334) indicate that the head is close to the disk. Such an indication can be used to control, for example, a heating element (e.g., one or more of the heating elements 122, 124) that affects head temperature and, in turn, affects head position relative to the disk. That is, if the threshold is consistently exceeded and/or modulations consistently occur as represented by the modulation detect signal, the head is too close to the disk and the temperature of the head should be adjusted to move the head farther from the disk. Exceeding the threshold is also referred to as traversing the threshold.

Plot 340 shows the outputs of the comparator 230 versus time. In plot 340, the output of the comparator 230 is shown as having pulses designated at reference numerals 342, 344, and 346. As shown in the plot 340, the width of pulse 346 is wider than the pulses 342 and 344 because the peak 338 exceeds the threshold 334 for more time than do the peaks 335 and 336.

Based on the pattern of pulses output from the comparator 230 a heater controller (e.g., the heater controller 240) can alter the energy provided to heating elements (e.g., the heating elements 122, 124) and thereby affect the head position. For example, the pulses 342, 344, and 346 indicate that modulation is present due to the resonant effect and, therefore, the head is flying close to the disk. Thus, variation in the envelope of the input signal results in feedback regarding head position and attendant energy provided to the head for heating, which, in turn, changes the head position (e.g., the flying height of the head). In one example implementation, the pulse train shown at reference numeral 340 may be used as a signal to selectively enable the heating elements when the pulse train has a low state.

Figure 4:
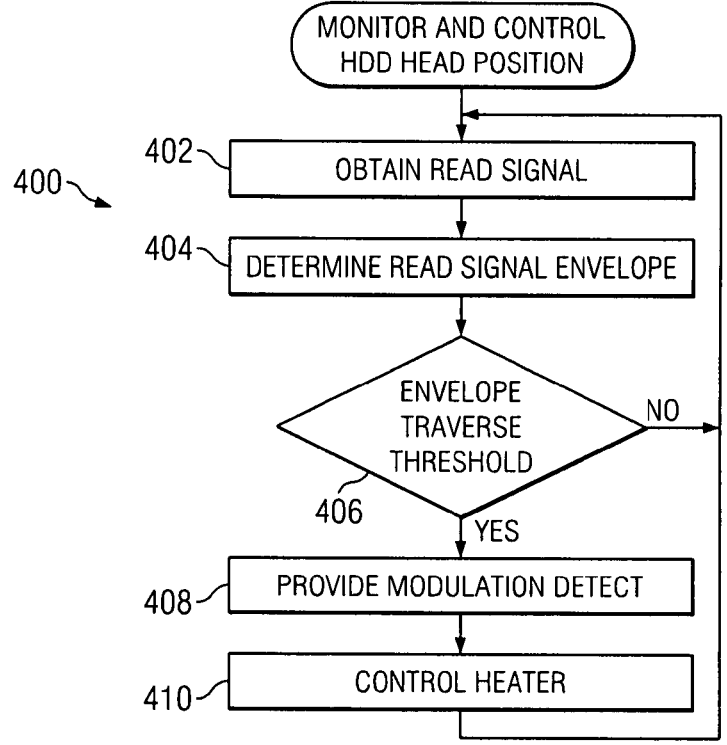
FIG. 4 is a flow diagram of an example monitor and control HDD head position process.

A process of monitoring and controlling HDD head position 400 is shown in FIG. 4. The process begins by obtaining a read signal or any other signal that varies with head distance relative to a platter (block 402). The envelope of the read signal is then obtained (block 404) because, in this example, the envelope of the read signal indicates the extent to which the head distance is close to the platter.

After the envelope is determined (block 404), the process 400 determines if the envelope traverses one or more thresholds (block 406). That is, the process 400 determines if the head is close to the platter thereby resulting in a varying envelope level.

If the threshold is not traversed (block 406), the process 400 continues to operate by obtaining a read signal and processing the same as described above. Conversely, if a threshold is traversed (block 406), the modulation detect will include pulses representing the points in time during which the threshold is exceeded (block 408) and the heater may be controlled based on the pulses (block 410). For example, in response to the pulses, the heater power level or duty cycle may be decreased.

As will be readily appreciated by those having ordinary skill in the art, the foregoing process may be implemented using hardware, software, firmware, or any suitable combination thereof. For example, the forgoing process may be implemented using circuits and systems as shown in the circuit diagrams described herein. Such circuits may, of course, be constructed from discrete components or from integrated circuits including the functionality of multiple discrete components. Furthermore, in some instances, the described systems and processes may be implemented using a processor, such as a digital signal processor or the like, programmed with software to obtain the read signal envelope and to compare the same to thresholds.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method for controlling a fly height of a head in a hard disk drive, the method comprising the steps of:
   determining a read signal envelope reflective of a proximity of the head to a disk;
   determining whether the read signal envelope traverses a threshold;
   repeating the step of determining a read signal envelope reflective of the proximity of the head to the disk when it is determined that the read signal envelope did not traverse the threshold;
   providing modulation detection when it is determined that the read signal envelope did traverse the threshold, wherein the modulation detection is indicative of a resonance effect between the head and the disk.

2. The method of claim 1 further comprising controlling a heater for altering the fly height in response to providing modulation detection.

3. The method of claim 1 further comprising obtaining the read signal before determining a read signal envelope.

4. The method of claim 1, wherein providing modulation detection further comprises determining whether the head is resonating with the disk.

5. The method of claim 4, wherein determining whether the head is resonating with the disk further comprises determining whether the head is too physically close to the disk.

6. A hard-disk drive system, comprising:
   a hard-disk drive platter;
   a hard-disk drive read head for reading information from the hard-disk drive platter and producing a read signal;
   a peak detector for transmitting a peak signal envelope representative of peaks in the read signal;
   a device for transmitting an amplified, buffered signal in response to receiving the peak signal envelope, wherein the device amplifies and buffers the peak signal envelope; and
   a comparator for receiving the amplified, buffered signal and a reference signal representative of when the hard-disk drive read head is physically close to the hard-disk drive platter,
   wherein the comparator is operative for comparing the amplified, buffered signal with the reference signal and transmitting an output signal with transitions that indicate modulation resulting from resonance in the amplified, buffered signal.

7. The hard-disk system of claim 6, further comprising a heating element proximate the hard-disk drive read head and operative for controlling the position of the hard-disk drive read head.

8. The hard-disk drive head position controller of claim 6, wherein the output signal has a duty cycle that indicates a height of the head with respect to the hard disk drive platter.

9. A hard-disk drive head position controller, comprising:
   a peak detector for transmitting a peak signal envelope representative of peaks in a received signal;
   an amplifier/filter coupled to receive the peak signal envelope and operative for transmitting an amplified signal;
   a buffer coupled to receive the amplified signal and operative for transmitting a buffered signal;
   a comparator for receiving the buffered signal and a reference signal representative of when a head is physically close to a platter,
   the comparator operative for comparing the amplified, buffered signal with the reference signal and transmitting an output signal with transitions that indicate modulation resulting from resonance in the amplified, buffered signal.

10. The hard-disk drive head position controller of claim 9, wherein the modulation indicates whether a head is too close to a disk.

11. The hard-disk drive head position controller of claim 10, wherein the output signal has a duty cycle that indicates a height of the head with respect to the disk.

12. The hard-disk drive head position controller of claim 9, further comprising a heating element proximate a hard-disk drive read head for controlling the position of the hard-disk drive read head in response to receiving the output signal.

* * * * *